C. A. PRICE & O. B. SEFFENS.
SIDE BEARING.
APPLICATION FILED APR. 26, 1915.

1,179,755.

Patented Apr. 18, 1916.
3 SHEETS—SHEET 1.

Witnesses
Wm. Janus.
C. S. Butler.

Inventors
Chas. A. Price
O. B. Seffens
By F. R. Cornwall, Atty.

C. A. PRICE & O. B. SEFFENS.
SIDE BEARING.
APPLICATION FILED APR. 26, 1915.
1,179,755.
Patented Apr. 18, 1916.
3 SHEETS—SHEET 2.
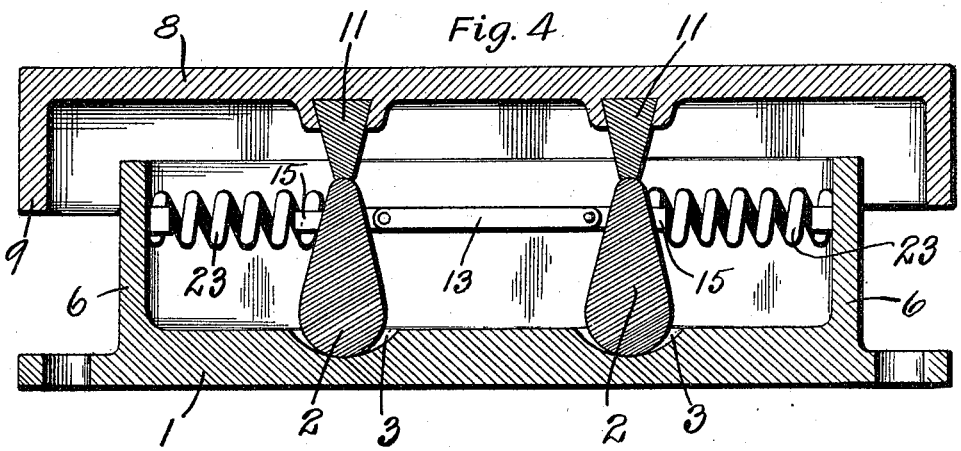
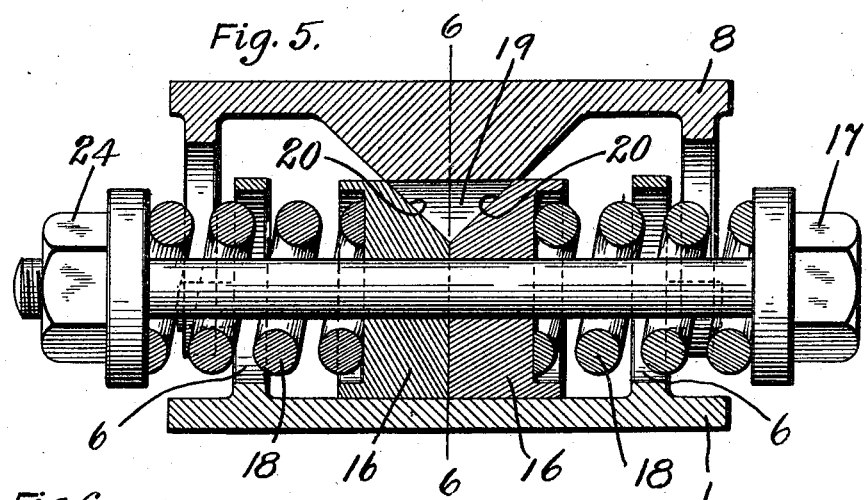
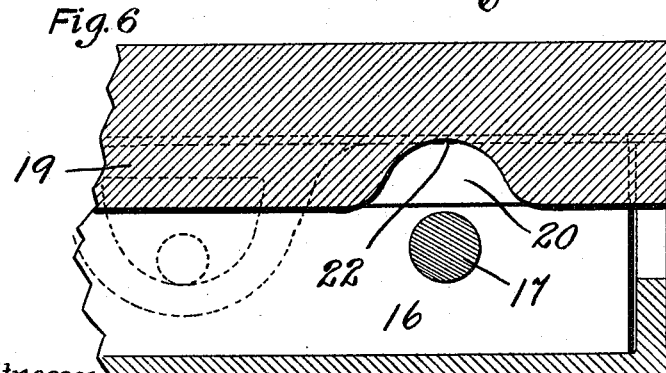
Witnesses
Wm. Janno.
C. D. Butler
Inventors
Chas. A. Price
O. B. Seffens
By ..... Att'y.

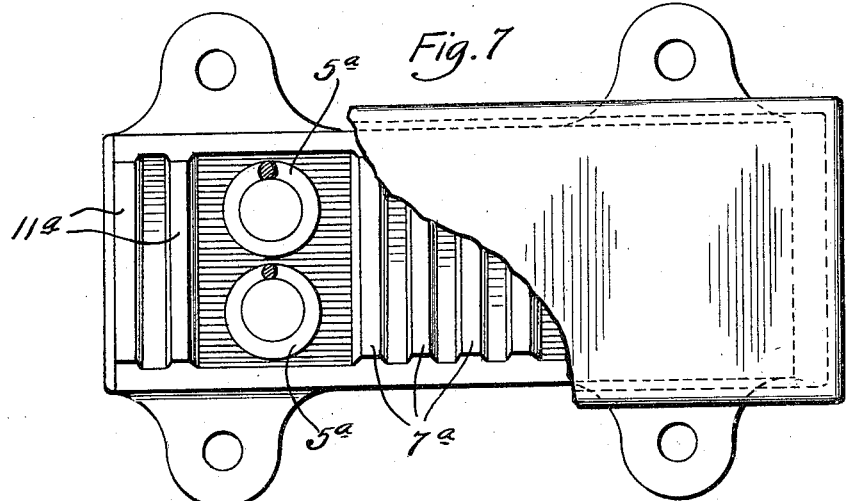
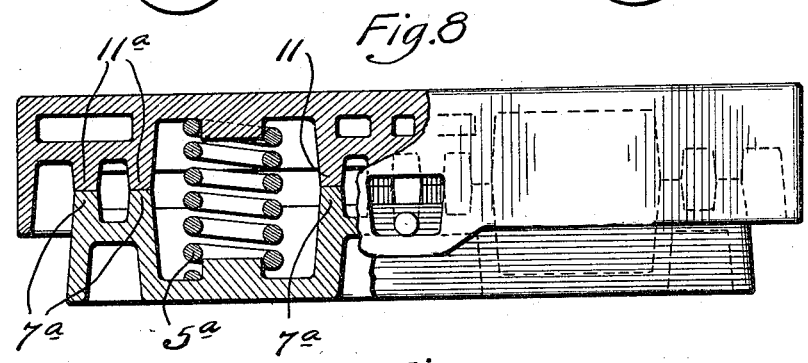
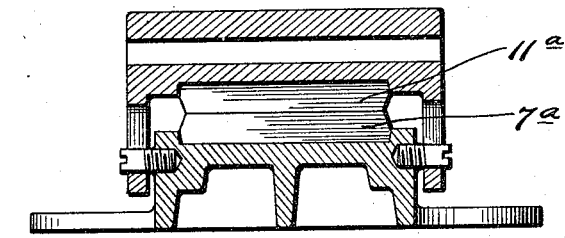

UNITED STATES PATENT OFFICE.

CHARLES A. PRICE AND ONLY BENJAMIN SEFFENS, OF MEMPHIS, TENNESSEE.

SIDE BEARING.

1,179,755.   Specification of Letters Patent.   Patented Apr. 18, 1916.

Application filed April 26, 1915. Serial No. 23,847.

*To all whom it may concern:*

Be it known that we, CHARLES A. PRICE and ONLY BENJAMIN SEFFENS, citizens of the United States, residing at Memphis, Tennessee, have invented a certain new and useful Improvements in Side Bearings, of which the following is a full, clear, and exact description, such as will enable others skilled in the art to which it appertains to make and use the same, reference being had to the accompanying drawings, forming part of this specification, in which—

Figure 1:
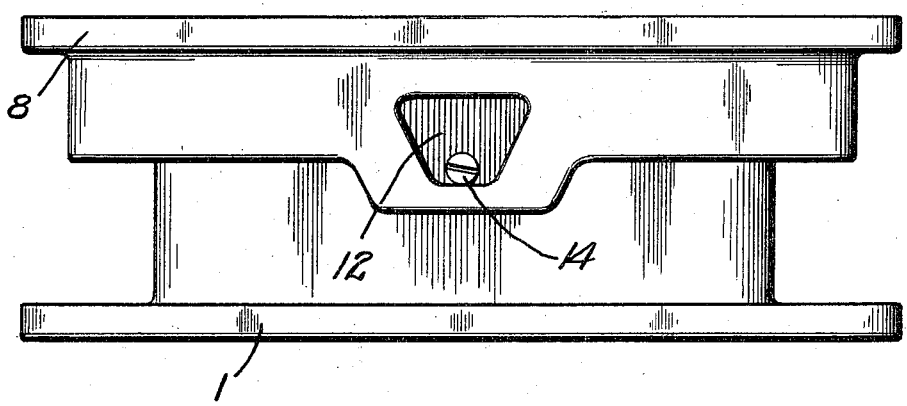
Figure 2:
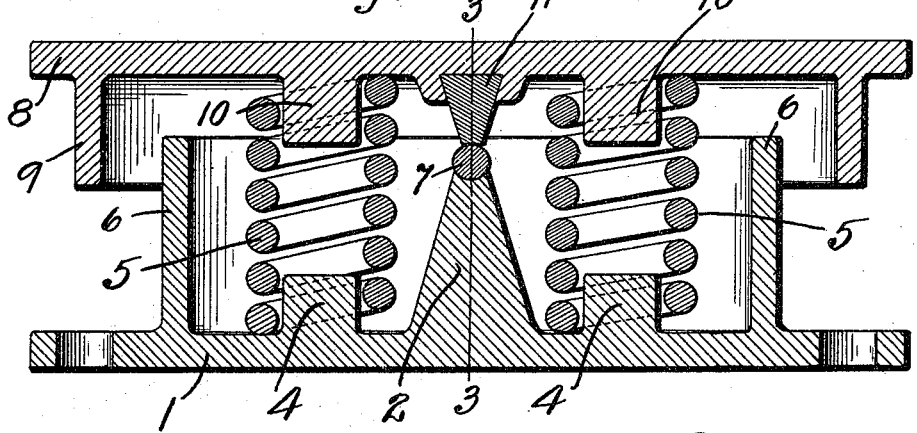
Figure 3:
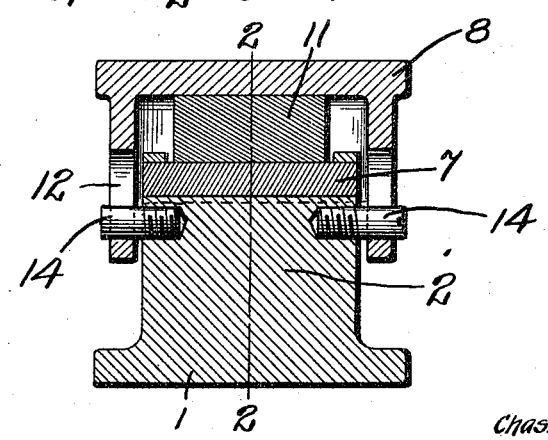

Figure 1 is a side elevation of one form of our invention. Fig. 2 is a longitudinal sectional elevation. Fig. 3 is a transverse sectional elevation taken on the line 3—3 of Fig. 2. Fig. 4 is a longitudinal sectional elevation of a modified form. Fig. 5 is a transverse sectional elevation showing another form. Fig. 6 is a fragmentary vertical section on line 6—6 of Fig. 5 showing substantially one half of the side bearing. Figs. 7, 8 and 9 are respectively a top view, side view, and transverse section of a third modified form.

The object of our invention is to provide an improved compensating side bearing having self contained means for centering the movable table of the bearing relative to the supporting portion.

As shown in Figs. 1, 2 and 3, the preferred form of our invention comprises a base plate 1, which is provided with a supporting member 2. Upon the base plate 1 are formed lugs 4. On either side of member 2 and secured to the lugs are centering springs 5. A vertical flange 6 surrounds the springs 5 and the supporting member 2. At its top, member 2 is provided with a bearing member 7 of suitable hardened material presenting at its upper side a bearing surface. The upper or table member 8 is provided with a depending flange 9 which projects down below the upper edge of the flange 6 on the supporting member and is spaced apart therefrom at the ends of the bearings to allow movement of the table member relative to the base member. The table member is also provided with lugs 10 to which the springs 5 are attached at their upper ends. Secured in the table member is an upper bearing member 11 which is adapted to rest upon the bearing member 7 of the supporting member. Apertures 12 are formed in the depending flange of the table member and through them base pins 14 are set in the lower member. The apertures 12 are of such size as permits the longitudinal movement of the table member relative to the pins 14. The bearing is adapted to be secured to the truck bolster by a suitable attaching means which engages the flange of the lower member 1 and the bearing member of the body bolster is adapted to rest upon the table member 8.

In operation when the body of the car is alined with reference to the truck bolster, the car being supported by the center bearing normally no weight will be placed upon the side bearings and the table member 8 will be centered with respect to the lower member by the springs 5 which tend to maintain the upper bearing 11 upon the lower bearing 7. When, however, due to the relative shifting of the car body and trucks the weight is thrown on one of the side bearings and the car body moves relative to the truck, the table member 8 will be shifted longitudinally and the upper bearing member 11 displaced from the lower bearing member 7, the springs compensating for the elevation of the truck, but yieldably supporting the car body to prevent oscillation thereof. When the car body and trucks again come into alinement, the table member 8 will be returned by the springs 5 and positioned with its bearing member 11 on the bearing member 7 of the lower member. When the bearing member 11 is displaced from the lower bearing member, the table 8 will be depressed against the tension of the springs 5 and thus afford compensation for any added elevation of the side of the truck affected.

The modification shown in Fig. 4 has substantially the same arrangement of table member 8 and lower member 1 with their corresponding vertical flanges. In this form, however, the supporting members 2 are in the form of transversely extending wedges having convex bases which are seated in concave seats 3 in the lower member 1. In this form, the bearing members 2 have convex upper surfaces and the upper bearing members 11 have concave lower faces which tend to keep them in engagement with the lower bearing members 2 yet allow rocking movement between the two. When a plurality of lower bearing members 2 is employed as illustrated in Fig. 4, they are pivotally connected by proper means such as the link 13 which allows them to rock together in their seats. Horizontal springs 23 are secured at one end to the flange 6 of the lower member and at their other ends to suitable lugs 15 on the supporting members 2. The tension of the springs 23 tend to maintain the supporting members 2 in vertical position and permits their rocking movement longitudinally of the bearing. In this form, the upper bearing members 11 and the lower members 2 are not disengaged by the movement of the table member 8 relative to the lower member 1 and the vertical compensation of the table member 8 is secured by virtue of the change in elevation of the engaging lines of the upper supporting member 11 and the lower supporting members 2 when the latter are rocked in their seats.

In the form illustrated in Figs. 5 and 6, longitudinal friction members 16 are carried on the base plate 1 so as to be movable toward and from the vertical flanges 6. Near the ends of this form of bearing are bolts 17 which pass through the friction members 16 and which carry springs 18 which press against the friction members 16 and tend to hold them together. The table member 8 is provided with a depending wedge member 19 which rests in the groove formed by beveled portions 20 of the friction members. Above the bolt 17, the wedge member is cut away as shown at 22 in Fig. 6, to accommodate the bolts when the wedge member is depressed. In this form, when the weight is thrown upon the table member 8, it will be depressed so as to force the wedge member 19 between the friction member 16 which will yield laterally against the tension of springs 18. In this action, the friction between the friction member 16 and the base plate 1 will tend to prevent the sudden depression of the table member 8. When the pressure upon the table member 8 is relieved, the friction members will be forced inwardly by the springs 18 and thus cause a gradual return of the table member 8 to normal elevation. The tension of springs 18 may be controlled by the adjustment of nuts 24 upon the bolts 17.

In the modified form illustrated in Figs. 7, 8, and 9 it will be seen that bearing members 7a and 11a are located on the table member and base member respectively at both sides of the springs 5a. In the form illustrated in Figs. 1, 2, and 3, the springs operate to normally center the table member so that the thrusts of side movements of the car body will normally be carried by these bearing members. The operation of this form is otherwise as above described with reference to the form illustrated in Figs. 1, 2, and 3.

We are aware that the device is capable of adaptations and modifications not herein described or illustrated without departing from the scope or spirit of the invention, and is susceptible of use as a body side bearing when inverted and attached to a car body portion.

What we claim is:

1. A side bearing comprising in combination, a base member, a supporting member carried by said base member, a table member, a bearing member carried by said table member and adapted to rest upon said supporting member, and means for centering said table member relative to the normal position of said supporting member.

2. In a side bearing, the combination of a base member, a table member relatively movable thereto, a supporting member carried by the base member, a bearing member carried by the table member and adapted to rest upon the supporting member, and yielding members carried by said base member and adapted to compensate for changes of position of said table member relative to said base member.

3. In a side bearing, the combination of a base member, a table member supported thereon and adapted for vertical movement relative to said base member, means carried by said base member for supporting said table member when the latter is in normal position, and means carried by said base member adapted to return said table member to normal position when it has been displaced.

4. In a side bearing, the combination of a base member provided with upright flanges, a table member provided with depending flanges adapted to surround said upright flanges, a supporting member carried by said base member, a bearing member carried by said table member and adapted to rest upon said supporting member, and means between said base member and said table member for positioning the latter relative to the former.

5. In a device of the class described, the combination of a base member and a table member mounted for relative horizontal and vertical movements, bearing members carried respectively on said base and table members and adapted to coöperate to support said members one upon the other, when said base and table members are in normal relative position, and yielding pressure means coöperating with said base and table members and operating to resist movement thereof toward each other and to urge said members to normal relative position.

In testimony whereof we hereunto affix our signatures in the presence of two witnesses, this 22nd day of April, 1915.

CHARLES A. PRICE.
O. BENJAMIN SEFFENS.

Witnesses:
W. L. LOWE,
R. M. THORNTON.